United States Patent Office 3,316,287
Patented Apr. 25, 1967

3,316,287
ORGANIC POLYALKYLENEOXY BORATES
Leslie G. Nunn, Jr., New York, N.Y., and Leslie M. Schenck, Mountainside, and Robert E. Leary, Westfield, N.J., assignors to General Aniline & Film Corporation, New York, N.Y., a corporation of Delaware
No Drawing. Filed Apr. 6, 1964, Ser. No. 357,791
5 Claims. (Cl. 260—462)

This invention relates to a new and useful class of organic polyalkyleneoxy borates having surface active properties and many valuable industrial applications.

We have found that a novel class of organic polyalkyleneoxy borates are readily synthesized by the ester interchange between an alkyl- or aryl-polyalkyleneoxy alkanol and a triphenyl borate or a substituted triphenyl borate at a temperature of from 130° to 250° C. and a pressure of from 1 to 10 mm. for a period of time ranging from 1 to 10 hours. In this ester interchange reaction the original borate is gradually converted to the new borate by removing volatile phenol or volatile substituted phenol from the equilibrium established during the heating. This method provides for high yields of relatively pure triesters of boron and in addition provides for the reaction to be conducted in a simple distillation apparatus without the need of solvents, filtration, etc., thereby providing an economical method for manufacture. In conducting the reaction, 3 moles of either an alkyl- or aryl-polyalkyleneoxy alkanol or a mixture thereof containing either one mole of the alkyl- or aryl- and 2 moles of either the alkyl- or aryl-polyalkyleneoxy alkanol is reacted with 1 mole of triphenyl borate or substituted triphenyl borate within the said temperature, pressure and time range. During this ester-inter-change 3 moles of phenol or substituted phenol are released and removed from the reaction product by vaporization. The resulting borates range from viscous oils to waxy solids, which are particularly adaptable as functional fluids such as, for example, hydraulic fluids, synthetic lubricants, etc., in water-repellant formulations, in cosmetics, as mold-release agents, and in other industrial applications as will be pointed out hereinafter.

The organic polyalkyleneoxy borates may also be prepared by conducting the ester-inter-change stepwise, i.e., by first reacting one mole of ether the alkyl- or aryl-polyalkyleneoxy alkanol. After removal of phenol or substituted phenol, the reaction is continued by the addition of one mole of the same or different alkanol until one mole of phenol or substituted phenol is removed. The reaction may then be completed by the addition of one mole of the same or different alkanol until the third mole of phenol or substituted phenol is removed. The reaction conditions are the same as above. In lieu of the three step process, the reaction may be conducted in two steps, i.e., by first reacting 2 moles of either the alkyl- or aryl-polyalkyleneoxy alkanol or an equimolar mixture of both and then concluding the reaction by the addition of one mole of either type alkanol.

The organic polyalkyleneoxy borates prepared in accordance with the present invention are characterized by the following general formula:

$$\left[ R\text{—}O\text{—}(CH_2CHR_1\text{—}O)_{m-1}\text{—}(CH_2CH_2O)_n\text{—} \right]_3 B$$

wherein R represents at least one member of the group consisting of either a straight or branched chain alkyl radical containing from 10 to 28 carbon atoms, e.g., decyl, hendecyl, dinonyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, myricyl, etc., or an aryl radical of 6 to 14 carbon atoms, e.g., phenyl, diphenyl, naphthyl, 2- and 5-anthryl, etc. which are unsubstituted or substituted by a chloro or dichloro mono-, di- or tri-alkyl of from 1 to 18 carbon atoms, e.g., dimethylphenyl, dipropylphenyl, nonylphenyl, dinonylphenyl, octadecylphenyl, trioctadecylphenyl, etc., $R_1$ represents either hydrogen, methyl, ethyl, phenyl or cyclohexene oxide and $m$ and $n$ represent a positive integer of from 1 to 150.

The polyalkyleneoxy alkanols from straight or branched chain alkyl alcohols of 10 to 28 carbon atoms and the polyalkylene aryl alcohols and the various alkylates characterized by the formula

$$R\text{—}O\text{—}(CH_2CHR_1\text{—}O)_m\text{—}H$$

wherein R and $R_1$ have the same values as above and $m$ has a value of from 1 to 150, prior to borate formation, are prepared by the usual methods of the prior art. Suitable methods for their preparation are described in United States Patents 1,970,578, 2,213,477, 2,575,832, 2,593,112 and 2,676,975. In this connection it is to be noted that the prior art teaches the straight or branched chain alkyl alcohol or aryl alcohol and various alkylated derivatives thereof may be reacted with a single oxide such as ethylene oxide, propylene oxide, butylene oxide, styrene oxide or vinyl cyclohexene dioxide or mixtures thereof in various proportions to yield surface active agents. Such agents may be employed in accordance with the present invention. When oxides of higher carbon atom content or mixtures of ethylene oxide with the higher oxides are used to produce the surface active agents, such agents, before they can be employed in accordance with the present invention, must be chain ended with at least one mole of ethylene oxide prior to the ester-inter-change with the tri-substituted borate compound. The number of moles of ethylene oxide may range from 1 to 150.

As examples of tri-substituted borate compounds, which may be employed in the ester-inter-change reaction, the following are illustrative:

triphenyl borate
tris (o-cresyl) borate
tris (m-cresyl) borate
tris (p-cresyl) borate
tris (2,4-xylenyl) borate
tris (2,4-dichlorophenyl) borate.

The following illustrative examples will show how the alkyl-, aryl-polyalkyleneoxy borates and mixtures thereof are prepared and how they may be employed in various industrial applications.

*Example 1*

Into a 2-liter flask equipped for vacuum distillation there was added a mixture consisting of 145 grams (0.5 mole) of triphenyl borate and 561 grams (1.5 moles) of a commercial lauryl alcohol ethoxylate containing 4 moles of ethylene oxide per unit of lauryl alcohol and the mixture gradually heated with agitation from ambient temperature to 110° C. under reduced pressure of 1 mm. The temperature was gradually increased at the same pressure to 225° C. for a period of 2 hours during which the phenol distillate was collected into a trap. There were obtained 139.2 grams of phenol amounting to 97.7% of the theoretical. The resulting liquid product has an infrared spectrum consistent with the following structure:

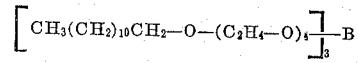
$$\left[ CH_3(CH_2)_{10}CH_2\text{—}O\text{—}(C_2H_4\text{—}O)_4\text{—} \right]_3 B$$

When subjected to Drave's wetting out test (Draves, Am. Dyestuff Reptr., 28, 421 (1939), 0.1% solution of the resulting liquid had a wetting out time of 21 seconds at 25° C. and 44 seconds at 70° C.

Example II

Example I was repeated with the exception that the lauryl alcohol ethoxylate was replaced by 590 grams (1 mole) of oleyl alcohol ethoxylate containing 7 moles of ethylene oxide per unit of oleyl alcohol and the triphenyl borate reduced to 97 grams (0.33 mole). A total of 94 grams of phenol (100% of theoretical) was obtained by distillation. Drave's wetting test on product at 25° C., 0.1% wetting was 120 seconds.

Example III

Into a 1-liter flask equipped for vacuum distillation there was added a mixture consisting of 90 grams (0.31 mole) of triphenyl borate and 286 grams (0.93 mole) of a commercial nonylphenol ethoxylate containing 2 moles of ethylene oxide per unit of nonylphenol and the mixture gradually heated with agitation from ambient to 110° C. at a reduced pressure of 1 mm. The reaction mixture was gradually increased to 225° C. for 1 hour at a reduced pressure of 5 mm. during which 84.5 grams of phenol was obtained. This represents a 96.8% conversion of reactants to a liquid product having the following structure:

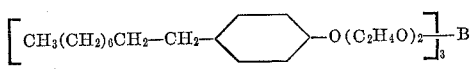

Example IV

While employing the procedure of Example I, 385 grams (0.25 mole) of nonylphenol condensed with 30 moles of ethylene oxide was reacted with 24.2 grams (0.083 mole) of triphenyl borate. The phenol distillate weighed 21.6 grams or 92% of the theoretical. Product had Ross-Miles Foam (oil and soap 18, 99 (1941), 50° C., 0.1% of 155 mm. at start, 130 mm. at 5 minutes. Drave's wetting at 25° C., 0.1% wetting out time was >300 seconds.

Example V

Following the procedure of Example I, 34 grams (0.186 mole) of triphenyl borate were reacted with 199 grams (0.56 mole) of stearyl alcohol condensed with 2 moles of ethylene oxide. The product yield based upon phenol recovery was 91% of theoretical of a waxy solid product having the following structure:

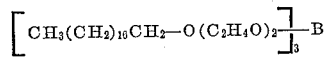

Example VI

The procedure of Example I was repeated using 204 grams (0.6 mole) of dodecylphenol condensed with 2 moles of ethylene oxide and 66.5 grams (0.2 mole) of tri-cresyl borate. A total of 60.5 grams of a liquid product representing 93.5% of the theoretical quantity of cresol was obtained by distillation.

Example VII

Following the procedure of Example I, 670.8 grams (0.1 mole) of o-cresol ethoxylated with 150 moles of ethylene oxide and 9.65 grams (0.033 mole) of triphenyl borate were heated to 225° C. at 4 mm. A total of 8.3 grams of phenol (88% of theoretical) was obtained and the residual solid has the following structure:

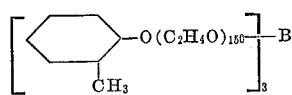

Example VIII

Operating as in Example I, 471 grams (1 mole) of Alfol 1214 (a $C_{13}$ linear alcohol) condensed with a mixture consisting of five moles of ethylene oxide and one mole of butylene oxide was transesterified with 96.5 grams (0.33 mole) of triphenyl borate. There was obtained 85.5 grams of phenol indicating that the borate had been formed in 91% of the theoretical yield.

Example IX

A mixture of 371 grams (1 mole) of docosanol condensed with one mole of ethylene oxide and 96.5 grams (0.33 mole) of triphenyl borate were heated as described in Example I. The phenol distillate weighed 28 grams representing 92% of the theoretical yield of a waxy solid compound having the following structure:

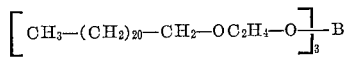

Example X

Following the procedure of Example I, 48.5 grams (0.167 mole) of triphenyl borate were reacted with 351 grams (0.5 mole) of 2,4,6-tri-tertiary butylphenol condensed with 10 moles of ethylene oxide. The resulting product has the following structure:

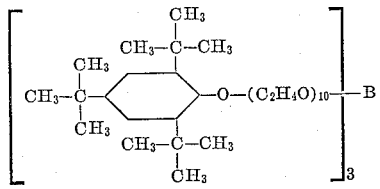

Example XI

In a manner similar to Example I, 1108 grams (0.25 mole) of methanol condensed with 100 moles of ethylene oxide was reacted with 72.5 grams (0.25 mole) of triphenyl borate. After removing 23 grams of phenol by distillation, the reaction mass was cooled to 100° C. and 117 grams (0.25 mole) of docosyl phenol condensed with two moles of ethylene oxide was added and the mixture was heated to 225° C. (5 mm.). An additional 20 grams of phenol was obtained and the product had primarily the following structure:

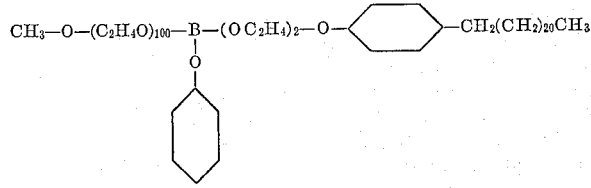

The above product was heated to 225° C. at a reduced pressure of 5 mm. with 47 grams (0.25 mole) of 4-chloro-o-cresoxyethanol. An additional 18 grams of phenol was obtained and the product had the following structure:

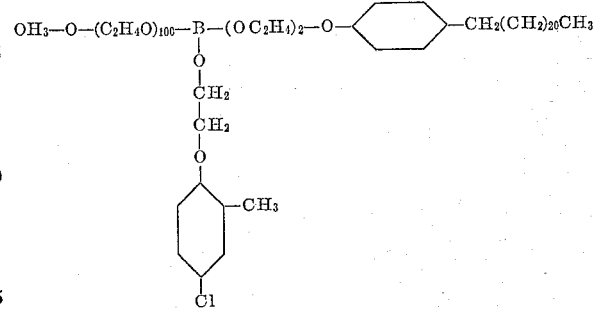

Example XII 207 grams (1.0 mole) of 2,4-dichlorophenoxy ethanol was reacted with 96.5 grams (0.33 mole) of triphenyl borate as described in Example I. The resulting solid product has the following structure:

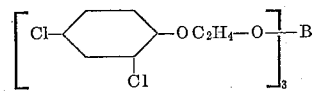

Example XIII

A mixture of 534 grams (1 mole) of phenol condensed with 10 moles of ethylene oxide and 166 grams (0.33 mole) of tris(2,4-dichlorophenyl) borate was heated as described in Example I. A total of 143 grams (88% of theoretical) of 2,4-dichlorophenol was obtained by distillation.

Example XIV

A mixture of 214 grams (1.0 mole) of phenol condensed with one mole of styrene oxide was reacted with 96.5 grams (0.33 mole) of triphenyl borate as described in Example I. A total of 86 grams (91.5% of theoretical) of phenol was obtained by distillation. Analysis of the product was consistent with the following empirical formula:

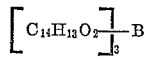

Example XV

A mixture of 316.5 grams (1.0 mole) of 4-chloro-o-cresol condensed with three moles of propylene oxide and 96.5 grams (0.33 mole) of triphenyl borate were reacted as described in Example I. The resulting liquid product has the following structure:

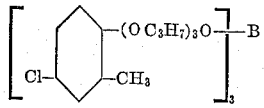

All of the foregoing compounds incorporate not only the desirable functions of the borates, but also impart surface active properties to oil in water systems. They may be used in the formulation of functional fluids, paints, plastics, greases, lubricants and other petroleum products, catalysts, drugs, textile auxiliaries, and the like. In the formulation of functional fluids they may be used to modify lubricating, viscosity and other rheological properties. They may be used in hydraulic and refrigeration systems. Their mild nature makes them of value in applications such as cosmetics, detergents, polishes, fabric cleaners and other cleaning products for household and industrial uses. They also are applicable in non-aqueous media such as solvent base paints and other protective coatings and the like. They may also be used in textile processing such as in fiber finishes, water repellants, antistatic agents, weighting textile goods, kier boiling, scouring, and other textile applications. These esters may also be used to improve strength in cotton goods. They may also be used to modify the surface properties of leather, wood, paper and other related materials. Another use is as modifiers in protective coatings, such as paints and enamels. Still another use is in the preparation of catalyst carriers. They may also be used in the manufacture of polymers as intermediates such as cross-linking agents and to improve scratch resistance. They are also useful in biocidal formulations as emulsifiers, in industrial applications such as defoamers, corrosion inhibitors, refractory binders in investment casting, gelling agents, additives to improve adhesion of protective coatings such as lacquers and resins to glass.

We claim:

1. An organic polyalkyleneoxy borate of the following formula:

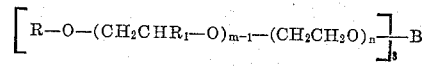

wherein R represents at least one member of the group consisting of alkyl of from 10 to 28 carbon atoms and aryl of from 6 to 14 carbon atoms, said aryl containing as a substituent a member selected from the class consisting of hydrogen, chloro and dichloro, mono-, di- and tri-alkyl groups of from 1 to 18 carbon atoms, $R_1$ represents a member selected from the class consisting of hydrogen, methyl, ethyl, phenyl and cyclohexene oxide, and $m$ and $n$ represent a positive integer of from 1 to 150.

2. The organic polyalkyleneoxy borate having the following formula:

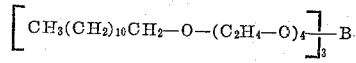

3. The organic polyalkyleneoxy borate having the following formula:

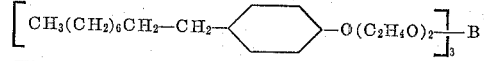

4. The organic polyalkyleneoxy borate having the following formula:

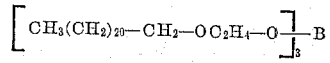

5. The organic polyalkyleneoxy borate having the following formula:

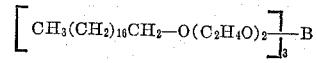

References Cited by the Examiner
FOREIGN PATENTS
630,611 11/1961 Canada.

OTHER REFERENCES
Rippere et al.: J. Phys. Chem., vol. 47, p. 220 (1943).

CHARLES B. PARKER, *Primary Examiner.*
DELBERT R. PHILLIPS, *Assistant Examiner.*